United States Patent
Hu

(10) Patent No.: US 9,414,262 B2
(45) Date of Patent: Aug. 9, 2016

(54) INTERFERENCE SUPPRESSION METHOD AND APPARATUS

(71) Applicant: Huawei Technologies Co., Ltd., Shenzhen, Guangdong (CN)

(72) Inventor: Minjie Hu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 14/297,342

(22) Filed: Jun. 5, 2014

(65) Prior Publication Data

US 2014/0362820 A1    Dec. 11, 2014

(30) Foreign Application Priority Data

Jun. 8, 2013    (CN) .......................... 2013 1 0227472

(51) Int. Cl.

| | |
|---|---|
| *H04W 28/04* | (2009.01) |
| *H04W 72/04* | (2009.01) |
| *H04W 56/00* | (2009.01) |
| *G06F 1/08* | (2006.01) |
| *G06F 1/12* | (2006.01) |
| *H04B 15/04* | (2006.01) |

(52) U.S. Cl.
CPC .............. *H04W 28/048* (2013.01); *G06F 1/08* (2013.01); *G06F 1/12* (2013.01); *H04B 15/04* (2013.01); *H04W 56/001* (2013.01); *H04W 72/0453* (2013.01); *H04B 2215/065* (2013.01); *H04B 2215/068* (2013.01)

(58) Field of Classification Search
None
See application file for complete search history.

(56) References Cited

U.S. PATENT DOCUMENTS

| | | | |
|---|---|---|---|
| 5,745,848 A | 4/1998 | Robin | |
| 2002/0142724 A1 | 10/2002 | Nakano | |
| 2004/0087277 A1* | 5/2004 | Edge | H04W 56/001 455/67.16 |
| 2004/0203396 A1 | 10/2004 | Black et al. | |
| 2005/0008113 A1* | 1/2005 | Kokubo | G06F 1/04 375/376 |
| 2007/0224940 A1 | 9/2007 | Pankinaho et al. | |
| 2008/0253355 A1* | 10/2008 | Tominaga | H04B 7/2621 370/350 |
| 2010/0137025 A1 | 6/2010 | Tal et al. | |
| 2012/0127133 A1 | 5/2012 | Frank | |

FOREIGN PATENT DOCUMENTS

| | | |
|---|---|---|
| CN | 1160951 A | 10/1997 |
| EP | 0 704 833 A2 | 4/1996 |
| JP | 2001177380 A | 6/2001 |
| WO | WO 2004/019378 A2 | 3/2004 |

* cited by examiner

Primary Examiner — Jenee Williams

(57) ABSTRACT

Embodiments of the present invention provide an interference suppression method and apparatus, which can eliminate interference of a digital circuit with an analog circuit. The method includes: receiving a system clock, where a current frequency of the system clock is a first frequency; and converting the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, and a frequency increment of the second frequency relative to the first frequency is less than or equal to a preset threshold.

14 Claims, 5 Drawing Sheets

---

Receive a system clock, where a current frequency of the system clock is a first frequency — 101

↓

Convert the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, and a frequency increment of the second frequency relative to the first frequency is less than or equal to a preset threshold — 102

INTERFERENCE SUPPRESSION METHOD AND APPARATUS

CROSS-REFERENCE TO RELATED APPLICATION

This application claims priority to Chinese Patent Application No. 201310227472.6, filed on Jun. 8, 2013, which is hereby incorporated by reference in its entirety.

TECHNICAL FIELD

The present invention relates to the field of communications, and in particular, to an interference suppression method and apparatus.

BACKGROUND

With the development of communications technologies, wireless base stations begin to develop towards the directions of miniaturization, low cost, and low power consumption. Because ROC (Radio On Chip, Radio On Chip) integrates a digital part and an RF (Radio Frequency, radio frequency) part into a single chip and can greatly reduce an area of a board and a cost and power consumption of abase station, the ROC becomes one of the future developing trends of wireless base stations.

However, the ROC also introduces some new problems, that is, how to prevent interference of a digital circuit with an RF circuit and how to prevent interference between RF circuits. In the prior art, there is a method for preventing interference of a digital circuit in an ROC chip with an RF circuit. In the method, a digital multiphase clock solution is adopted to suppress interference of a digital circuit with an analog circuit. When a single-phase clock is adopted, digital circuits inside the chip basically all transit near a rising edge of the clock; therefore a great charge and discharge current exists, and a high interference pulse is produced near the rising edge. If an N-phase clock is adopted, a chip current is dispersed into clock rising edges of N different phases, and therefore energy of interference of a single clock is greatly reduced. For a wireless base station, harmful interference comes from an instantaneous high-level signal, while low-magnitude interference is submerged in background noise and therefore does not seriously affect radio communication. Therefore, by adopting the digital multiphase clock solution, the interference of the digital circuit with the analog circuit can be suppressed.

In the method for suppressing the interference of the digital circuit with the analog circuit by adopting the digital multiphase clock solution, the inventor finds that the method has at least the following problems: First, the solution is not inheritable, that is, when the scale of the digital chip increases, energy of an interference peak can be reduced only by adding a clock phase; second, when a great number of clock phases are required, a high-frequency input clock is needed, which is bad for both PLL (Phase Locked Loop, phase locked loop) selection and STA (Static Timing Analysis, static timing analysis) backend convergence; third, because in the method, a chip clock is divided into a plurality of phases, in order to prevent a problem that a requirement on interference isolation between some analog circuits in a physical layout cannot be met, clocks in a same phase need to be dispersed as much as possible in the physical layout, so that interference introduced by the clocks in the same phase to a particular location is as small as possible, and this increases design complexity of the solution; fourth, the method cannot eliminate an interference signal and can only reduce energy of an interference signal, and therefore cannot meet high requirements of radio communications indicators (such as sensitivity, a signal EVM (Error Vector Magnitude, error vector magnitude), and an ACLR (Adjacent Channel Leakage Ratio, adjacent channel leakage ratio)) in some scenarios.

SUMMARY

Embodiments of the present invention provide an interference suppression method and apparatus, which can eliminate interference of a digital circuit with an analog circuit. In addition, the solution is inheritable and does not require a multiphase clock, and has a simple physical layout.

To achieve the foregoing objective, the embodiments of the present invention adopt the following technical solutions:

According to a first aspect, an interference suppression method is provided, where the method includes:

receiving a system clock, where a current frequency of the system clock is a first frequency; and converting the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, and a frequency increment of the second frequency relative to the first frequency is less than or equal to a preset threshold.

In a first possible implementation manner, according to the first aspect, that the optimal clock is selected, with reference to the sensitive frequency band, from the system clock and at least one planned clock which is determined according to the first frequency specifically includes:

determining the at least one planned clock according to the first frequency, where the frequency increment of the second frequency of the at least one planned clock relative to the first frequency is less than or equal to the threshold; and selecting the optimal clock from the system clock and the at least one planned clock with reference to the sensitive frequency band and according to a first principle, where the first principle includes:

selecting a clock of which no high-order harmonic falls within a transmit band and the receive band as a candidate clock, so that when the optimal clock is the candidate clock, the optimal clock and the high-order harmonics of the optimal clock do not fall within the receive band of the sensitive frequency band, and the optimal clock and the high-order harmonics of the optimal clock do not fall within the transmit band of the sensitive frequency band;

if one candidate clock exists, using the candidate clock as the optimal clock;

if a plurality of candidate clocks exists, selecting a clock with a lowest frequency from the candidate clocks as the optimal clock; or when no candidate clock exists, selecting a clock capable of implementing interference suppression within the receive band of the sensitive frequency band as the optimal clock, so that the optimal clock and the high-order harmonics of the optimal clock do not fall within the receive band of the sensitive frequency band.

In a second possible implementation manner, according to the first aspect or the first possible implementation manner, the second frequency is a clock frequency generated by dividing the first frequency by an integer.

In a third possible implementation manner, according to the first aspect or the first possible implementation manner or the second possible implementation manner, after the converting the system clock into an optimal clock of a current sensitive frequency band, the method further includes:

fitting the optimal clock, so that a clock frequency after the fitting does not change relative to the first frequency.

In a fourth possible implementation manner, according to the third possible implementation manner, the fitting the optimal clock specifically includes:

determining whether the system clock is the same as the optimal clock;

when the system clock is different from the optimal clock, performing periodic cumulative counting on a clock edge quantity of the optimal clock to obtain a current count value, where a count period is a clock edge quantity of the optimal clock included in a period T;

determining a relationship between the current count value and a preconfigured valid clock edge quantity, where the preconfigured valid clock edge quantity is a clock edge quantity of the system clock included in the period T;

if the current count value is greater than the preconfigured valid clock edge quantity, gating a current clock edge of the optimal clock;

if the current count value is less than or equal to the preconfigured valid clock edge quantity, outputting a current clock edge of the optimal clock; or when the system clock is the same as the optimal clock, outputting a current clock edge of the optimal clock.

In a fifth possible implementation manner, according to the fourth possible implementation manner, the determining whether the system clock is the same as the optimal clock specifically includes:

determining, according to a preconfigured gating enable parameter, whether the system clock is the same as the optimal clock.

According to a second aspect, an interference suppression apparatus is provided, where the apparatus includes a receiving unit and a converting unit, where the receiving unit is configured to receive a system clock, where a current frequency of the system clock is a first frequency; and the converting unit is configured to convert the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, a frequency increment of the second frequency relative to the first frequency is less than or equal to a preset threshold, and the converting unit is configured according to the first frequency and a clock frequency of the optimal clock.

In a first possible implementation manner, according to the second aspect, that the optimal clock is selected, with reference to the sensitive frequency band, from the system clock and at least one planned clock which is determined according to the first frequency specifically includes:

determining the at least one planned clock according to the first frequency, where the frequency increment of the second frequency of the at least one planned clock relative to the first frequency is less than or equal to the threshold; and selecting the optimal clock from the system clock and the at least one planned clock with reference to the sensitive frequency band and according to a first principle, where the first principle includes:

selecting a clock of which no high-order harmonic falls within a transmit band and the receive band as a candidate clock, so that when the optimal clock is the candidate clock, the optimal clock and the high-order harmonics of the optimal clock do not fall within the receive band of the sensitive frequency band, and the optimal clock and the high-order harmonics of the optimal clock do not fall within the transmit band of the sensitive frequency band;

if one candidate clock exists, using the candidate clock as the optimal clock;

if a plurality of candidate clocks exists, selecting a clock with a lowest frequency from the candidate clocks as the optimal clock; or when no candidate clock exists, selecting a clock capable of implementing interference suppression within the receive band of the sensitive frequency band as the optimal clock, so that the optimal clock and the high-order harmonics of the optimal clock do not fall within the receive band of the sensitive frequency band.

In a second possible implementation manner, according to the second aspect or the first possible implementation manner, the second frequency is a clock frequency generated by dividing the first frequency by an integer.

In a third possible implementation manner, according to the second aspect or the first possible implementation manner or the second possible implementation manner, the apparatus further includes a fitting unit, where the fitting unit is configured to: after the converting unit converts the system clock into the optimal clock of a current sensitive frequency band, fit the optimal clock, so that a clock frequency after the fitting does not change relative to the first frequency.

In a fourth possible implementation manner, according to the third possible implementation manner, the fitting unit includes a first determining module, a counting module, a second determining module, and a control module, where the first determining module is configured to determine whether the system clock is the same as the optimal clock;

the counting module is configured to: when the system clock is different from the optimal clock, perform periodic cumulative counting on a clock edge quantity of the optimal clock to obtain a current count value, where a count period of the counting module is a clock edge quantity of the optimal clock included in a period T;

the second determining module is configured to determine a relationship between the current count value and a preconfigured valid clock edge quantity, where the preconfigured valid clock edge quantity is a clock edge quantity of the system clock included in the period T;

the control module is configured to: if the current count value is greater than the preconfigured valid clock edge quantity, gate a current clock edge of the optimal clock;

the control module is further configured to: if the current count value is less than or equal to the preconfigured valid clock edge quantity, output a current clock edge of the optimal clock; or the control module is further configured to: when the system clock is the same as the optimal clock, output a current clock edge of the optimal clock.

In a fifth possible implementation manner, according to the fourth possible implementation manner, that the first determining module determines whether the system clock is the same as the optimal clock specifically includes:

determining, according to a preconfigured gating enable parameter, whether the system clock is the same as the optimal clock.

In a sixth possible implementation manner, according to the fifth possible implementation manner, the control module includes an OR gate, a D flip-flop, and a clock gating unit, where the first determining module is gating disabled, a first input end of the OR gate is connected to a gating disabled end of the first determining module, a second input end of the OR gate is connected to an output end of the second determining module, an output end of the OR gate is connected to an input end of the D flip-flop, a clock input end of the D flip-flop inputs the optimal clock, and an output end of the D flip-flop is connected to an enable end of the clock gating unit;

that the control module is configured to: if the current count value is greater than the preconfigured valid clock edge quantity, gate a current clock edge of the optimal clock specifically includes that:

when the system clock is different from the optimal clock, the gating enable parameter is enable 1, and the gating disabled end of the first determining module is 0; if the current count value is greater than the preconfigured valid clock edge quantity, the output end of the second determining module is 0, and in this case, the output end of the OR gate outputs 0; when the optimal clock input by the clock input end of the D flip-flop increases from a low level to a high level, the output end of the D flip-flop outputs 0, and in this case, the enable end of the clock gating unit is connected to 0, and the clock gating unit stops outputting the current clock edge of the optimal clock;

that the control module is further configured to: if the current count value is less than or equal to the preconfigured valid clock edge quantity, output a current clock edge of the optimal clock specifically includes that:

when the system clock is different from the optimal clock, the gating enable parameter is enable 1, and the gating disabled end of the first determining module is 0; if the current count value is less than or equal to the preconfigured valid clock edge quantity, the output end of the second determining module is 1, and in this case, the output end of the OR gate outputs 1; when the optimal clock input by the clock input end of the D flip-flop increases from a low level to a high level, the output end of the D flip-flop outputs 1, and in this case, the enable end of the clock gating unit is connected to 1, and the clock gating unit outputs the current clock edge of the optimal clock; or that the control module is further configured to: when the system clock is the same as the optimal clock, output a current clock edge of the optimal clock specifically includes that:

when the system clock is the same as the optimal clock, the gating enable parameter is disable 0, the gating disabled end of the first determining module is 1, and in this case, the output end of the OR gate outputs 1; when the optimal clock input by the clock input end of the D flip-flop increases from a low level to a high level, the output end of the D flip-flop outputs 1, and in this case, the enable end of the clock gating unit is connected to 1, and the clock gating unit outputs the current clock edge of the optimal clock.

The embodiments of the present invention provide an interference suppression method and apparatus. The method includes: receiving a system clock, where a current frequency of the system clock is a first frequency; and converting the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, and a frequency increment of the second frequency relative to the first frequency is less than or equal to a preset threshold.

Based on the description of the foregoing embodiments, in the present invention, with the method of flexibly adjusting the clock frequency so that the optimal clock and the high-order harmonics of the optimal clock do not fall within the receive band of the sensitive frequency band, interference of a digital circuit with an analog circuit can be eliminated. In addition, the optimal clock in the solution does not need to be generated by using a multiphase clock, and is only related to the current sensitive frequency band. Therefore, the solution has a simple physical layout, is inheritable, and reduces a development workload.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
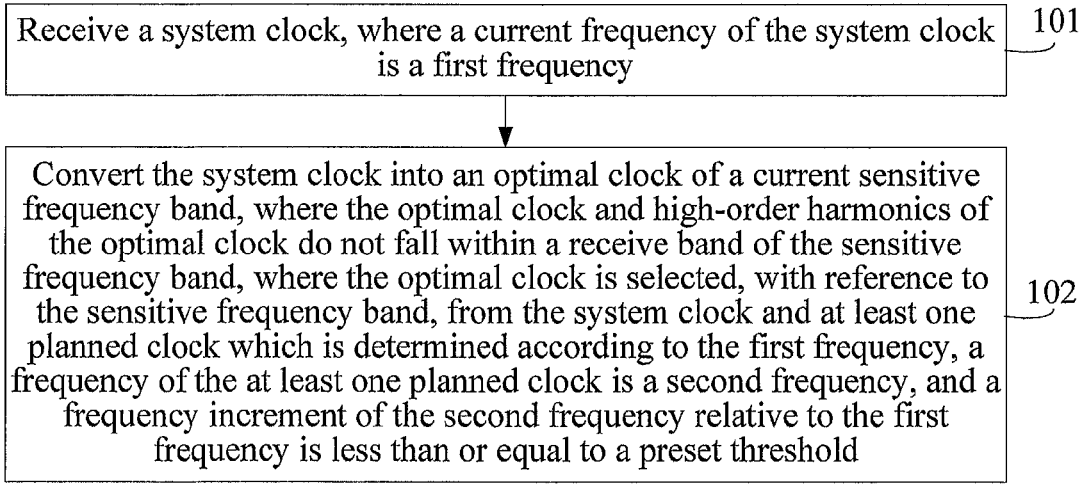
FIG. 1 is a flowchart of an interference suppression method according to an embodiment of the present invention.

The embodiment of the present invention provides an interference suppression method. As shown in FIG. 1, the method includes:

101: Receive a system clock, where a current frequency of the system clock is a first frequency.

Specifically, an execution body of the present invention is an interference suppression apparatus. The apparatus may specifically be an ROC chip, and may also be a PCB board having digital-analog interference, or the like, which is not specifically limited in the embodiment of the present invention, and is applicable to all scenarios where a digital circuit and an analog circuit coexist.

That the interference suppression apparatus specifically is an ROC chip in which a digital circuit interferes with an RF circuit is used as an example herein for description. When the ROC chip works, a system clock is received, where a current clock frequency of the system clock is a first frequency, and "first" in the first frequency does not have any special meaning and only refers to the current frequency of the system clock.

102: Convert the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, and a frequency increment of the second frequency relative to the first frequency is less than or equal to a preset threshold.

Specifically, when interference of a digital circuit with an RF circuit exists in an ROC chip, a sensitive frequency band exists in the ROC chip, where the sensitive frequency band is a frequency band where frequency point vulnerable to interference are located and is specifically a certain sub-band of a communication frequency band.

At present, a main radio communication radio frequency band range defined in the 3GPP protocol is 700 MHz-4 GHz (frequency band 1 to frequency band 43). As shown in Table 1, frequency ranges of sub-bands defined in the 3GPP protocol are listed. Certainly, for different protocols, different frequency ranges of frequency bands may be provided, which are not specifically limited in the embodiment of the present invention, and only the sub-bands defined in the 3GPP protocol are used for description. For example, if frequency ranges of frequency bands where frequency point, which are vulnerable to the interference, of the ROC chip are located are: a receive band: 1710 MHz-1785 MHz, and a transmit band: 1805 MHz-1880 MHz, the current sensitive frequency band is specifically a frequency band 3 in Table 1.

TABLE 1

| Working Frequency Band | Duplex Manner | Receive Band | | | Transmit Band | | |
|---|---|---|---|---|---|---|---|
| | | FUL_low | - | FUL_high | FDL_low | - | FDL_high |
| 1 | FDD | 1920 MHz | - | 1980 MHz | 2110 MHz | - | 2170 MHz |
| 2 | FDD | 1850 MHz | - | 1910 MHz | 1930 MHz | - | 1990 MHz |
| 3 | FDD | 1710 MHz | - | 1785 MHz | 1805 MHz | - | 1880 MHz |
| 4 | FDD | 1710 MHz | - | 1755 MHz | 2110 MHz | - | 2155 MHz |
| 5 | FDD | 824 MHz | - | 849 MHz | 869 MHz | - | 894 MHz |
| 6 | FDD | 830 MHz | - | 840 MHz | 875 MHz | - | 885 MHz |
| 7 | FDD | 2500 MHz | - | 2570 MHz | 2620 MHz | - | 2690 MHz |
| 8 | FDD | 880 MHz | - | 915 MHz | 925 MHz | - | 960 MHz |
| 9 | FDD | 1749.9 MHz | - | 1784.9 MHz | 1844.9 MHz | - | 1879.9 MHz |
| 10 | FDD | 1710 MHz | - | 1770 MHz | 2110 MHz | - | 2170 MHz |
| 11 | FDD | 1427.9 MHz | - | 1447.9 MHz | 1475.9 MHz | - | 1495.9 MHz |
| 12 | FDD | 699 MHz | - | 716 MHz | 729 MHz | - | 746 MHz |
| 13 | FDD | 777 MHz | - | 787 MHz | 746 MHz | - | 756 MHz |
| 14 | FDD | 788 MHz | - | 798 MHz | 758 MHz | - | 768 MHz |
| 15 | FDD | Reserved | | | Reserved | - | Reserved |
| 16 | FDD | Reserved | | | Reserved | - | Reserved |
| 17 | FDD | 704 MHz | - | 716 MHz | 734 MHz | - | 746 MHz |
| 18 | FDD | 815 MHz | - | 830 MHz | 860 MHz | - | 875 MHz |
| 19 | FDD | 830 MHz | - | 845 MHz | 875 MHz | - | 890 MHz |
| 20 | FDD | 832 MHz | - | 862 MHz | 791 MHz | - | 821 MHz |
| 21 | FDD | 1447.9 MHz | - | 1462.9 MHz | 1495.9 MHz | - | 1510.9 MHz |
| | | | | | Reserved | | Reserved |
| 33 | TDD | 1900 MHz | - | 1920 MHz | 1900 MHz | - | 1920 MHz |
| 34 | TDD | 2010 MHz | - | 2025 MHz | 2010 MHz | - | 2025 MHz |
| 35 | TDD | 1850 MHz | - | 1910 MHz | 1850 MHz | - | 1910 MHz |
| 36 | TDD | 1930 MHz | - | 1990 MHz | 1930 MHz | - | 1990 MHz |
| 37 | TDD | 1910 MHz | - | 1930 MHz | 1910 MHz | - | 1930 MHz |
| 38 | TDD | 2570 MHz | - | 2620 MHz | 2570 MHz | - | 2620 MHz |
| 39 | TDD | 1880 MHz | - | 1920 MHz | 1880 MHz | - | 1920 MHz |
| 40 | TDD | 2300 MHz | - | 2400 MHz | 2300 MHz | - | 2400 MHz |
| 41 | TDD | 2496 MHz | - | 2690 MHz | 2496 MHz | - | 2690 MHz |
| 42 | TDD | 3400 MHz | - | 3600 MHz | 3400 MHz | - | 3600 MHz |
| 43 | TDD | 3600 MHz | - | 3800 MHz | 3600 MHz | - | 3800 MHz |

When the ROC chip receives a system clock, the system clock is converted into an optimal clock of a current sensitive frequency band, where the optimal clock is selected, with reference to the sensitive frequency band, from the system clock and at least one planned clock which is determined according to the first frequency, a frequency of the at least one planned clock is a second frequency, and a frequency increment of the second frequency relative to the first frequency is less than or equal to a preset threshold.

Specifically, because a characterization parameter of a digital clock is a clock frequency, the essence of converting the system clock into the optimal clock of the sensitive frequency band is converting a clock frequency of a logic clock from the frequency of the system clock to a frequency of the optimal clock, so that high-order harmonics of a clock where main energy is concentrated are moved out of the receive band of the sensitive frequency band.

The present invention provides a method for determining an optimal clock, which is described by using the sub-bands defined in the 3GPP protocol, and the method is specifically as follows:

First, determine at least one planned clock according to the first frequency of the system clock, where a frequency of the at least one planned clock is a second frequency, and a frequency increment of the second frequency relative to the first frequency is less than or equal to a preset threshold.

Specifically, by taking into consideration that an increase of a clock frequency may cause difficulty in time convergence, to facilitate backend convergence, it is assumed that the preset threshold is 15% herein; in order to satisfy, as much as possible, a requirement of generating a PPL by means of integer frequency division (so as to avoid an impact of an accumulated frequency difference and phase difference on a digital system) and in consideration of a constraint of a VCO oscillation frequency, 261.12 MHz and 276.48 MHz are selected herein as frequencies of the planned clocks.

Second, select an optimal clock from the at least one planned clock with reference to the sensitive frequency band and according to a first principle.

Specifically, the first principle may include:

selecting a clock of which no high-order harmonic falls within a transmit band and the receive band as a candidate clock, so that when the optimal clock is the candidate clock, the optimal clock and the high-order harmonics of the optimal clock do not fall within the receive band of the sensitive frequency band, and the optimal clock and the high-order harmonics of the optimal clock do not fall within the transmit band of the sensitive frequency band;

if one candidate clock exists, using the candidate clock as the optimal clock;

if a plurality of candidate clocks exists, selecting a clock with a lowest frequency from the candidate clocks as the optimal clock; or when no candidate clock exists, selecting a clock capable of implementing interference suppression within the receive band of the sensitive frequency band as the optimal clock, so that the optimal clock and the high-order harmonics of the optimal clock do not fall within the receive band of the sensitive frequency band.

It should be noted that, to select the optimal clock with reference to the sensitive frequency band and according to the first principle, general distribution of the system clock and high-order harmonics of the system clock in radio communication frequency bands within 4 GHz, and general distribution of the planned clocks and high-order harmonics of the planned clocks in the radio communication frequency bands within 4 GHz should be analyzed first.

Specifically, it is assumed that the first frequency of the system clock is 245.76 MHz; refer to Table 2 for the general distribution of the system clock and the high-order harmonics of the system clock in the radio communication frequency bands within 4 GHz, and the general distribution of the planned clocks whose frequencies are 261.12 MHz and 276.48 MHz and the high-order harmonics of the planned clocks in the radio communication frequency bands within 4 GHz.

TABLE 2

| Harmonics | Case 1 (245.76 MHz) | Case 2 (261.12 MHz) | Case 3 (276.48 MHz) |
|---|---|---|---|
| 1 | 245.76 | 261.12 | 276.48 |
| 2 | 491.52 | 522.24 | 552.96 |
| 3 | 737.28 | 783.36 | 829.44 |
| 4 | 983.04 | 1044.48 | 1105.92 |
| 5 | 1228.8 | 1305.6 | 1382.4 |
| 6 | 1474.56 | 1566.72 | 1658.88 |
| 7 | 1720.32 | 1827.84 | 1935.36 |
| 8 | 1966.08 | 2088.96 | 2211.84 |
| 9 | 2211.84 | 2350.08 | 2488.32 |
| 10 | 2457.6 | 2611.2 | 2764.8 |
| 11 | 2703.36 | 2872.32 | 3041.28 |
| 12 | 2949.12 | 3133.44 | 3317.76 |
| 13 | 3194.88 | 3394.56 | 3594.24 |
| 14 | 3440.64 | 3655.68 | 3870.72 |
| 15 | 3686.4 | 3916.8 | NA |
| 16 | 3932.16 | NA | NA |

It is assumed that 5 ROC chips whose sensitive frequency bands are respectively a frequency band 1 to a frequency band 5 shown in Table 1 exist, with reference to the general distribution of the system clock and the high-order harmonics of the system clock, and the general distribution of the planned clocks and the high-order harmonics of the planned clocks in the radio communication frequency bands within 4 GHz shown in Table 2, Table 3 and Table 4 separately show which clock harmonics fall within receive bands and transmit bands of the frequency band 1 to the frequency band 5, where "-" indicates that no high-order harmonic falls within the frequency band.

TABLE 3

| Working Frequency Band | Duplex Manner | Receive Band | | | Clock Harmonics | | |
|---|---|---|---|---|---|---|---|
| | | FUL_low | - | FUL_high | 245.76 | 261.12 | 276.48 |
| 1 | FDD | 1920 MHz | - | 1980 MHz | 8 | — | 7 |
| 2 | FDD | 1850 MHz | - | 1910 MHz | — | — | — |
| 3 | FDD | 1710 MHz | - | 1785 MHz | 7 | — | — |
| 4 | FDD | 1710 MHz | - | 1755 MHz | 7 | — | — |
| 5 | FDD | 824 MHz | - | 849 MHz | — | — | 3 |

TABLE 4

| Working Frequency Band | Duplex Manner | Transmit Band | | | Clock Harmonics | | |
|---|---|---|---|---|---|---|---|
| | | FDL_low | - | FDL_high | 245.76 | 261.12 | 276.48 |
| 1 | FDD | 2110 MHz | - | 2170 MHz | — | — | — |
| 2 | FDD | 1930 MHz | - | 1990 MHz | 8 | — | 7 |
| 3 | FDD | 1805 MHz | - | 1880 MHz | — | 7 | — |
| 4 | FDD | 2110 MHz | - | 2155 MHz | — | — | — |
| 5 | FDD | 869 MHz | - | 894 MHz | — | — | — |

According to the first principle, for the frequency band 1, it can be determined that the planned clock whose frequency is 261.12 MHz and the planned clock whose frequency is 276.48 MHz are candidate clocks, and moreover, because the first principle specifies that if a plurality of candidate clocks exists, a clock with a lowest frequency in the candidate clocks is selected as the optimal clock, an optimal clock of the frequency band 1 is the clock with the frequency of 261.12 MHz.

Similarly, according to the first principle, it can be determined that optimal clocks of a frequency band 2 to the frequency band 5 are respectively:

Frequency band 2: 261.12 MHz
Frequency band 3: 276.48 MHz
Frequency band 4: 261.12 MHz
Frequency band 5: 245.76 MHz Certainly, if the sensitive frequency band is another sub-band defined in the 3GPP protocol, an optimal clock of the another sub-band defined in the 3GPP protocol can also be determined by using the foregoing method, and the embodiment of the present invention does not list examples one by one herein. Certainly, apart from the foregoing method, there may be other methods for determining the optimal clock. The embodiment of the present invention only provides one method for determining the optimal clock as an example, and is not specifically limited thereto.

The converting the system clock into the optimal clock of the sensitive frequency band may be implemented by using a converting unit. The converting unit is configured according to the first frequency and a clock frequency of the optimal clock, and the optimal clock and the high-order harmonics of the optimal clock do not fall within the receive band of the sensitive frequency band.

The embodiment of the present invention provides an interference suppression method. The method includes: receiving a system clock, where a current frequency of the system clock is a first frequency; and converting the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, and a frequency increment of the second frequency relative to the first frequency is less than or equal to a preset threshold.

Based on the description of the foregoing embodiment, in the present invention, with the method of flexibly adjusting the clock frequency so that the optimal clock and the high-order harmonics of the optimal clock do not fall within the receive band of the sensitive frequency band, interference of a digital circuit with an analog circuit can be eliminated. In addition, the optimal clock in the solution does not need to be generated by using a multiphase clock, and is only related to the current sensitive frequency band. Therefore, the solution has a simple physical layout, is inheritable, and reduces a development workload.

Embodiment 2

Figure 2:
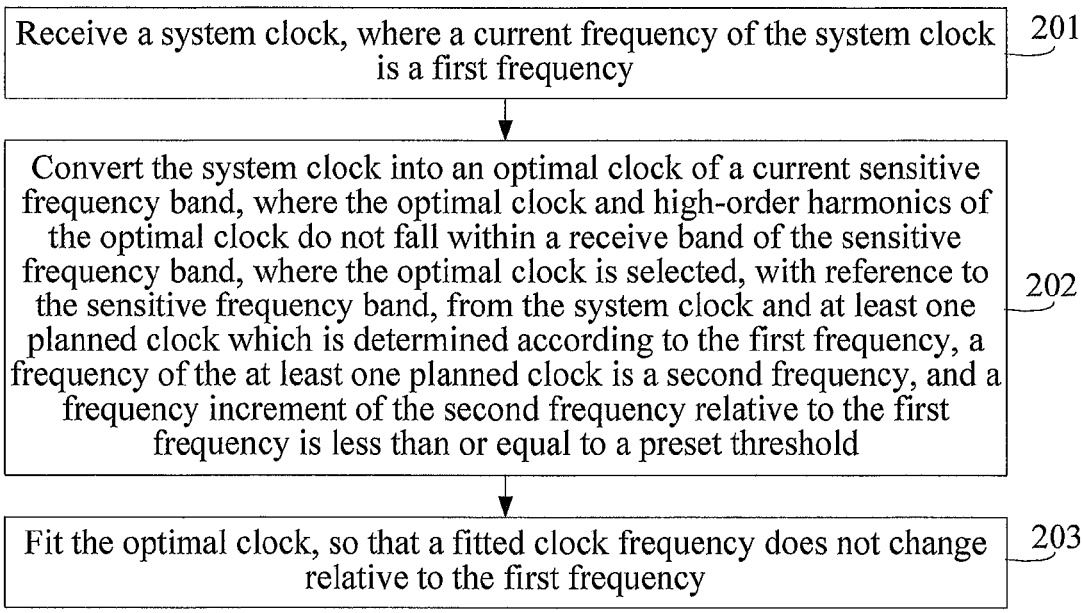
FIG. 2 is a flowchart of another interference suppression method according to an embodiment of the present invention.

The embodiment of the present invention further provides a interference suppression method, which is specifically shown in FIG. 2 and includes:

201: Receive a system clock, where a current frequency of the system clock is a first frequency.

Specifically, an execution body of the present invention is an interference suppression apparatus. The apparatus may specifically be an ROC chip, and may also be a PCB board having a digital-analog system, or the like, which is not specifically limited in the embodiment of the present invention, and is applicable to all scenarios where a digital circuit and an analog circuit coexist.

That the interference suppression apparatus specifically is an ROC chip in which a digital circuit interferes with an RF circuit is used as an example herein for description. When the ROC chip works, a system clock is received, where a current clock frequency of the system clock is a first frequency, and "first" in the first frequency does not have any special meaning and only refers to the current frequency of the system clock.

202: Convert the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, and a frequency increment of the second frequency relative to the first frequency is less than or equal to a preset threshold.

Specifically, when interference of a digital circuit with an RF circuit exists in an ROC chip, a sensitive frequency band exists in the ROC chip, where the sensitive frequency band is a frequency band where frequency point vulnerable to interference are located and is specifically a certain sub-band of a communication frequency band.

That the optimal clock is selected, with reference to the sensitive frequency band, from the system clock and at least one planned clock which is determined according to the first frequency specifically includes:

determining the at least one planned clock according to the first frequency, where the frequency increment of the second frequency of the at least one planned clock relative to the first frequency is less than or equal to the threshold; and selecting the optimal clock from the system clock and the at least one planned clock with reference to the sensitive frequency band and according to a first principle, where the first principle includes:

selecting a clock of which no high-order harmonic falls within a transmit band and the receive band as a candidate clock, so that when the optimal clock is the candidate clock, the optimal clock and the high-order harmonics of the optimal clock do not fall within the receive band of the sensitive frequency band, and the optimal clock and the high-order harmonics of the optimal clock do not fall within the transmit band of the sensitive frequency band;

if one candidate clock exists, using the candidate clock as the optimal clock;

if a plurality of candidate clocks exists, selecting a clock with a lowest frequency from the candidate clocks as the optimal clock; or when no candidate clock exists, selecting a clock capable of implementing interference suppression within the receive band of the sensitive frequency band as the optimal clock, so that the optimal clock and the high-order harmonics of the optimal clock do not fall within the receive band of the sensitive frequency band.

Certainly, in the first principle, in order to avoid an impact of an accumulated frequency difference and phase difference on a digital system, the second frequency may also be a clock frequency generated by dividing the first frequency by an integer, which is not specifically limited in the embodiment of the present invention.

Specifically, for a specific example of determining the optimal clock, reference may be made to the description of step 102 in Embodiment 1, and details are not repeatedly described in the embodiment of the present invention.

The converting the system clock into the optimal clock of the sensitive frequency band may be implemented by using a converting unit. The converting unit is configured according to the first frequency and a clock frequency of the optimal clock, and the optimal clock and the high-order harmonics of the optimal clock do not fall within the receive band of the sensitive frequency band.

203: Fit the optimal clock, so that a clock frequency after the fitting does not change relative to the first frequency.

Specifically, in order to multiplex a digital IP to a maximum degree, in the present invention, when the clock frequency planning solution is adopted to suppress interference, it is expected that a valid clock frequency of the entire system remains unchanged. Therefore, after the system clock is converted into the optimal clock of the sensitive frequency band, the optimal clock is further fitted, where the valid clock frequency remaining unchanged refers to that a clock frequency after the fitting does not change relative to the first frequency.

Figure 3:
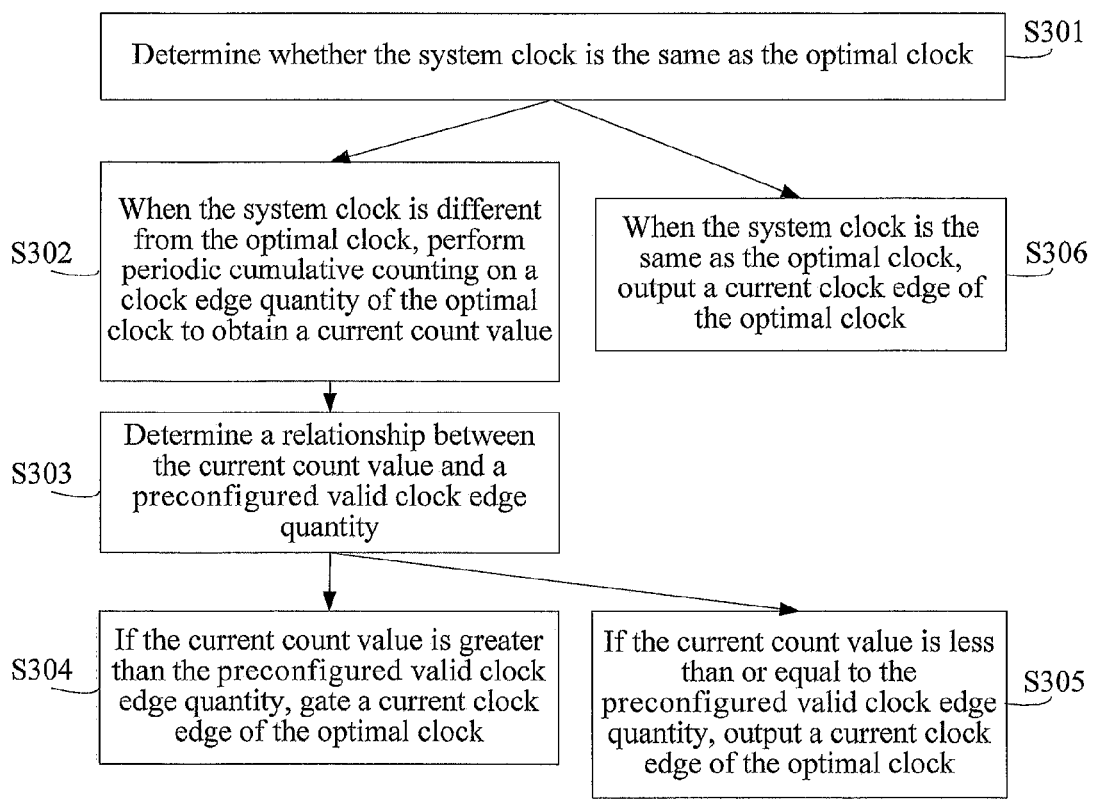
FIG. 3 is a flowchart of a method for fitting an optimal clock frequency within a period according to an embodiment of the present invention.

Specifically, the present invention provides a method for fitting the optimal clock frequency within a period, which is specifically shown in FIG. 3 and includes:

S301: Determine whether the system clock is the same as the optimal clock.

Specifically, the optimal clock may be the same as the system clock, and may also be different from the system clock, which is not specifically limited in the embodiment of the present invention. When the optimal clock is fitted, it is first determined whether the system clock is the same as the optimal clock.

A method for determining whether the system clock is the same as the optimal clock may include:

determining, according to a preconfigured gating enable parameter, whether the system clock is the same as the optimal clock.

Certainly, there may be other methods for determining whether the system clock is the same as the optimal clock, which are not specifically limited in the embodiment of the present invention.

When the system clock is the same as the optimal clock, step S306 is executed.

When the system clock is different from the optimal clock, step S302 is executed.

S302: When the system clock is different from the optimal clock, perform periodic cumulative counting on a clock edge quantity of the optimal clock to obtain a current count value, where a count period is a clock edge quantity of the optimal clock included in a period T.

Specifically, when the system clock is different from the optimal clock, periodic cumulative counting needs to be performed on a clock edge quantity of the optimal clock to obtain a current count value.

The periodic cumulative counting refers to that when an accumulated count value reaches a preconfigured count period, a counting module counts from 1 over again, and increases the count value by 1 each time a clock edge is received, where the count period is a clock edge quantity of the optimal clock included in a period T.

For example, if the period T=15.36 MHz, and it is determined according to the foregoing embodiment that in a main radio communication radio frequency band defined in the 3GPP protocol, a frequency of an optimal clock of a frequency band 1 is 261.12 MHz, because 15.36 MHz includes 17 clock periods of 261.12 MHz, a count period that may be preconfigured for a counting module of a device whose sensitive frequency band is the frequency band 1 is 17.

When a current accumulated count value reaches 17, if one more clock edge is received, the current count value jumps to 1.

S303: Determine a relationship between the current count value and a preconfigured valid clock edge quantity, where the preconfigured valid clock edge quantity is a clock edge quantity of the system clock included in the period T.

Specifically, continuing with the foregoing example, the period T=15.36 MHz; if it is assumed that a frequency of the system clock is 245.76 MHz, because 15.36 MHz includes 16 clock periods of 245.76 MHz, the preconfigured valid clock edge quantity is 16.

The relationship between the current count value and the preconfigured valid clock edge quantity is determined, if the current count value is greater than the preconfigured valid clock edge quantity, step S304 is executed.

If the current count value is less than or equal to the preconfigured valid clock edge quantity, step S305 is executed.

S304: If the current count value is greater than the preconfigured valid clock edge quantity, gate a current clock edge of the optimal clock.

Figure 4:
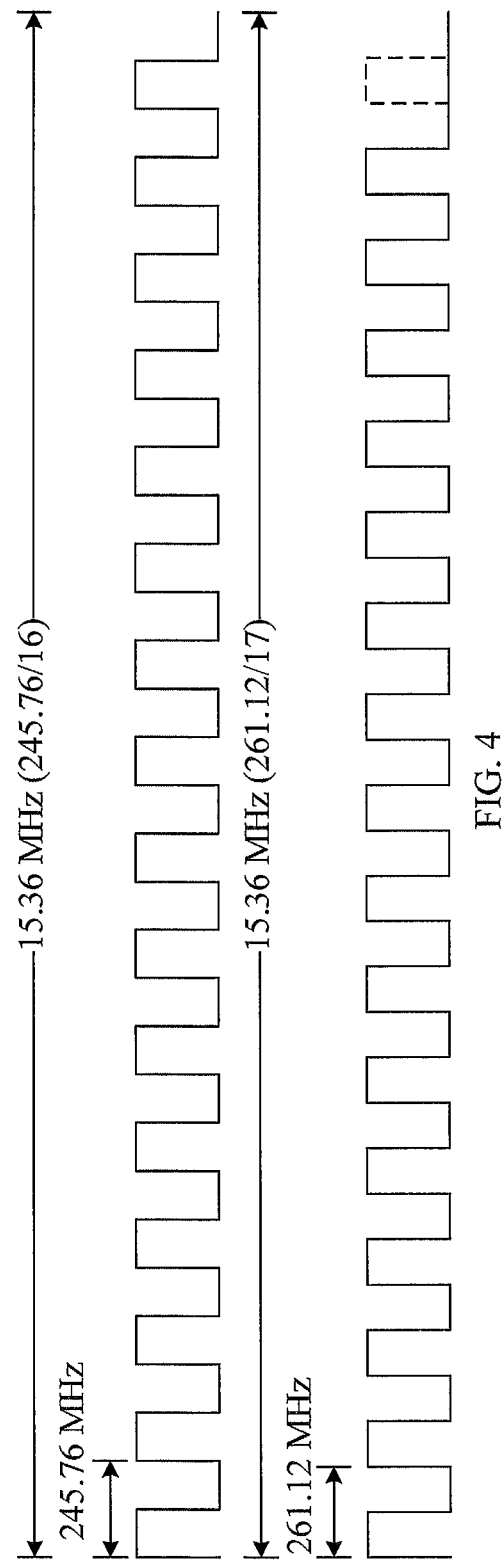
FIG. 4 is a schematic timing diagram of fitting a clock whose frequency is 261.12 MHz to a clock whose frequency is 245.76 MHz according to an embodiment of the present invention.

Specifically, as shown in FIG. 4, if the current sensitive frequency band is the frequency band 1 of the main radio communication radio frequency band defined in the 3GPP protocol, when periodic cumulative counting is performed on the clock edge quantity of the optimal clock, the obtained current count value is 17 while the preconfigured valid clock edge quantity is 16; in order to ensure that the valid clock frequency does not change, the current clock edge of the optimal clock needs to be gated, so that the device only outputs 16 clock edges within the period T=15.36 MHz, thereby ensuring that the valid clock frequency does not change. A dotted line indicates that the current clock edge is gated.

Figure 5:
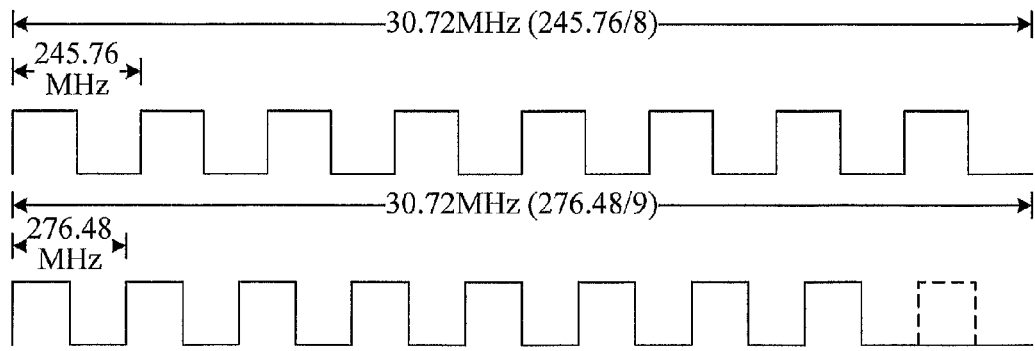
FIG. 5 is a schematic timing diagram of fitting a clock whose frequency is 276.48 MHz to a clock whose frequency is 245.76 MHz according to an embodiment of the present invention.

Certainly, if the frequency of the optimal clock is 276.48 MHz, fitting may be performed with reference to the foregoing method for fitting an optimal clock. FIG. 5 is a schematic timing diagram of fitting a clock whose frequency is 276.48 MHz to a clock whose frequency is 245.76 MHz when T=30.72 MHz, and details are not repeatedly described in the embodiment of the present invention.

S305: If the current count value is less than or equal to the preconfigured valid clock edge quantity, output a current clock edge of the optimal clock.

Specifically, if the current count value is less than or equal to the preconfigured valid clock edge quantity, the current clock edge of the optimal clock may be normally output until the current count value is greater than the preconfigured valid clock edge quantity. In this way, within the period T, the device only outputs clock edges whose quantity is equal to the valid clock edge quantity, so that the valid clock edge quantity does not change, thereby ensuring multiplexing of a digital IP.

S306: When the system clock is the same as the optimal clock, output a current clock edge of the optimal clock.

Specifically, when the system clock is the same as the optimal clock, it means that high-order harmonics of a clock where main energy is concentrated can be moved out of the receive band of the sensitive frequency band by using the current system clock, while frequency modulation is not needed. Because frequency modulation is not needed, the clock frequency of the optimal clock is equal to the clock frequency of the system clock. Therefore, the quantity of clock edges of the optimal clock output within the period T is equal to the quantity of clock edges of the system clock output within the period T. That is, within the period T, the quantity of output clock edges is equal to the valid clock edge quantity, so that the valid clock frequency does not change, thereby ensuring the multiplexing of the digital IP.

The method for periodic fitting of a clock frequency described in steps S301 to S306 ensures that during interference suppression, even when a logic clock frequency changes, the valid clock frequency does not change, thereby implementing the multiplexing of the digital IP to a maximum degree.

Figure 6:
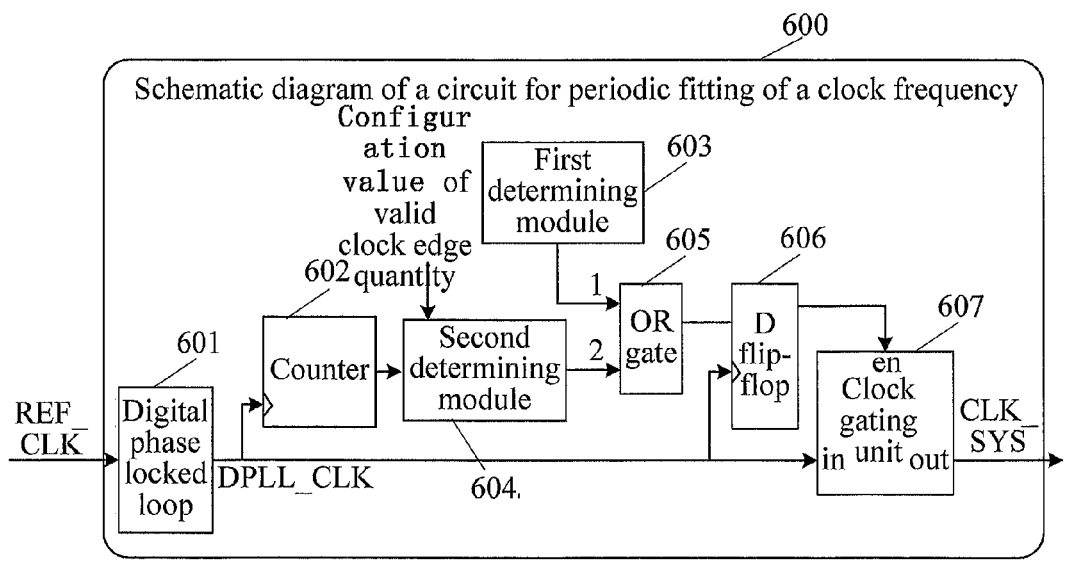
FIG. 6 is a schematic diagram of a circuit for fitting a clock frequency within a period according to an embodiment of the present invention.

Specifically, the foregoing method for periodic fitting of a clock frequency may be implemented by a circuit 600 for periodic fitting of a clock frequency shown in FIG. 6. The circuit includes a digital phase locked loop 601, a counter 602, a first determining module 603, a second determining module 604, an OR gate 605, a D flip-flop 606, and a clock gating unit 607.

A first input end of the OR gate 605 is connected to an output end of the first determining module 603, a second input end of the OR gate 605 is connected to an output end of the second determining module 604, an output end of the OR gate 605 is connected to an input end of the D flip-flop 606, a clock input end of the D flip-flop 606 inputs the optimal clock, and an output end of the D flip-flop 606 is connected to an enable end of the clock gating unit 607.

The first determining module 603 is configured to determine whether the system clock is the same as the optimal clock; and the second determining module 604 is configured to determine the relationship between the current count value and the preconfigured valid clock edge quantity. In the circuit 600 shown in FIG. 6, it is assumed that the first determining module 603 determines, according to the preconfigured gating enable parameter, whether the system clock is the same as the optimal clock, and the first determining module 603 is gating disabled; in this case, a configuration of the main radio communication radio frequency band defined in the 3GPP protocol shown in Table 1 may be as shown in Table 5.

TABLE 5

| Application Scenario | | Gating Configuration | |
| --- | --- | --- | --- |
| Frequency of the optimal clock | Clock frequency after fitting | Gating enable | Configuration value of the count period |
| 245.76 MHz | 245.76 MHz | Disable 0 | NA |
| 261.12 MHz | 245.76 MHz | Enable 1 | 17 |
| 276.48 MHz | 245.76 MHz | Enable 1 | 9 |

According to the configuration of the main radio communication radio frequency band defined in the 3GPP protocol shown in Table 5, a working principle of the circuit 600 is as follows:

When the system clock is different from the optimal clock, it can be known from Table 5 that, the gating enable parameter is enable 1; therefore, the gating disabled end of the first determining module 603 in the circuit 600 outputs 0; because the first input end of the OR gate 605 is connected to the gating disabled end of the first determining module 603, the first input end of the OR gate 605 is 0; if the current count value of the counter 602 is greater than the preconfigured valid clock edge quantity, the output end of the second determining module 604 is 0; because the second input end of the OR gate 605 is connected to the output end of the second determining module 604, the second input end of the OR gate 605 is 0; in this case, both the first input end and the second input end of the OR gate 605 are 0, and therefore, the output end of the OR gate 605 outputs 0; when the optimal clock input by the clock input end of the D flip-flop 606 increases from a low level to a high level, the output end of the D flip-flop 606 outputs 0; in this case, the enable end, which is connected to the output end of the D flip-flop 606, of the clock gating unit 607 is connected to 0, and the clock gating unit 607 stops outputting the current clock edge of the optimal clock, which is corresponding to step S304;

certainly, when the first input end of the OR gate 605 is 0, if the current count value of the counter 602 is less than or equal to the preconfigured valid clock edge quantity, the output end of the second determining module 604 is 1; because the second input end of the OR gate 605 is connected to the output end of the second determining module 604, the second input end of the OR gate 605 is 1; in this case, the first input end of the OR gate 605 is 0 and the second input end of the OR gate 605 is 1, and therefore, the output end of the OR gate 605 outputs 1; when the optimal clock input by the clock input end of the D flip-flop 606 increases from a low level to a high level, the output end of the D flip-flop 606 outputs 1; in this case, the enable end, which is connected to the output end of the D flip-flop 606, of the clock gating unit 607 is connected to 1, and the clock gating unit 607 outputs the current clock edge of the optimal clock, which is corresponding to step S305; or when the system clock is the same as the optimal clock, it can be known from Table 5 that, the gating enable parameter is disable 0, and therefore, the gating disabled end of the first determining module 603 in the circuit 600 outputs 1; in this case, because the first input end of the OR gate 605 is connected to the gating disabled end of the first determining module 603, the first input end of the OR gate 605 is 1, and therefore, it can be directly learned that the output end of the OR gate 605 outputs 1; when the optimal clock input by the clock input end of the D flip-flop 606 increases from a low level to a high level, the output end of the D flip-flop 606 outputs 1; in this case, the enable end, which is connected to the output end of the D flip-flop 606, of the clock gating unit 607 is connected to 1, and the clock gating unit 607 outputs the current clock edge of the optimal clock, which is corresponding to step S306.

It can be known that the foregoing circuit can implement periodic fitting of a clock frequency and therefore can ensure that a valid clock frequency does not change, thereby multiplexing the digital IP to a maximum degree. In addition, by opening some parameters, interference suppression for a plurality of frequency bands or even all frequency bands can be implemented.

Certainly, the foregoing circuit for implementing periodic fitting of a clock frequency is only one specific implementation manner for implementing periodic fitting of a clock frequency, and there may be other circuits for implementing periodic fitting of a clock frequency. Details are not described in the embodiment of the present invention. In addition, besides the foregoing method for fitting the optimal clock frequency within a period, there may be other methods for fitting the optimal clock, which are not specifically limited in the embodiment of the present invention either.

The embodiment of the present invention provides an interference suppression method. The method includes: receiving a system clock, where a current frequency of the system clock is a first frequency; and converting the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, and a frequency increment of the second frequency relative to the first frequency is less than or equal to a preset threshold.

Based on the description of the foregoing embodiment, in the present invention, with the method of flexibly adjusting the clock frequency so that the optimal clock and the high-order harmonics of the optimal clock do not fall within the receive band of the sensitive frequency band, interference of a digital circuit with an analog circuit can be eliminated. In addition, the optimal clock in the solution does not need to be generated by using a multiphase clock, and is only related to the current sensitive frequency band. Therefore, the solution has a simple physical layout, is inheritable, and reduces a development workload.

Embodiment 3

Figure 7:
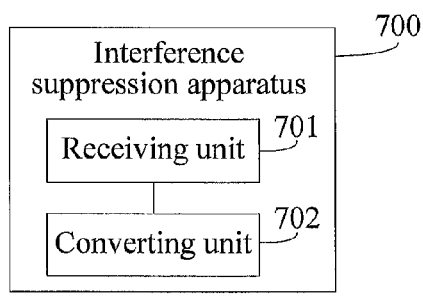
FIG. 7 is a schematic diagram of an interference suppression apparatus according to an embodiment of the present invention.

The embodiment of the present invention provides an interference suppression apparatus 700. As specifically shown in FIG. 7, the apparatus 700 includes: a receiving unit 701 and a converting unit 702.

The receiving unit 701 is configured to receive a system clock, where a current frequency of the system clock is a first frequency.

The converting unit 702 is configured to convert the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, a frequency increment of the second frequency relative to the first frequency is less than or equal to a preset threshold, and the converting unit 702 is configured according to the first frequency and a clock frequency of the optimal clock.

Further, that the optimal clock is selected, with reference to the sensitive frequency band, from the system clock and at least one planned clock which is determined according to the first frequency specifically includes:

determining the at least one planned clock according to the first frequency, where the frequency increment of the second frequency of the at least one planned clock relative to the first frequency is less than or equal to the threshold; and selecting the optimal clock from the system clock and the at least one planned clock with reference to the sensitive frequency band and according to a first principle, where the first principle includes:

selecting a clock of which no high-order harmonic falls within a transmit band and the receive band as a candidate clock, so that when the optimal clock is the candidate clock, the optimal clock and the high-order harmonics of the optimal clock do not fall within the receive band of the sensitive frequency band, and the optimal clock and the high-order harmonics of the optimal clock do not fall within the transmit band of the sensitive frequency band;

if one candidate clock exists, using the candidate clock as the optimal clock;

if a plurality of candidate clocks exists, selecting a clock with a lowest frequency from the candidate clocks as the optimal clock; or when no candidate clock exists, selecting a clock capable of implementing interference suppression within the receive band of the sensitive frequency band as the optimal clock, so that the optimal clock and the high-order harmonics of the optimal clock do not fall within the receive band of the sensitive frequency band.

Specifically, for a method for selecting the optimal clock, reference may be made to the description of step 102 in Embodiment 1, and details are not repeatedly described in the embodiment of the present invention.

Further, in order to avoid an impact of an accumulated frequency difference and phase difference on a digital system, the second frequency is a clock frequency generated by dividing the first frequency by an integer.

Figure 8:
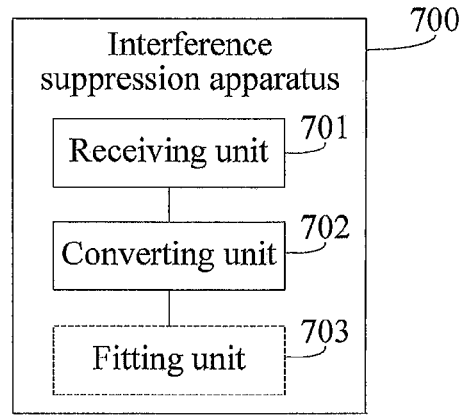
FIG. 8 is a schematic diagram of another interference suppression apparatus according to an embodiment of the present invention.

Further, as shown in FIG. 8, the apparatus 700 further includes a fitting unit 703.

The fitting unit 703 is configured to: after the converting unit 702 converts the system clock into the optimal clock of the sensitive frequency band, fit the optimal clock, so that a clock frequency after the fitting does not change relative to the first frequency.

Figure 9:
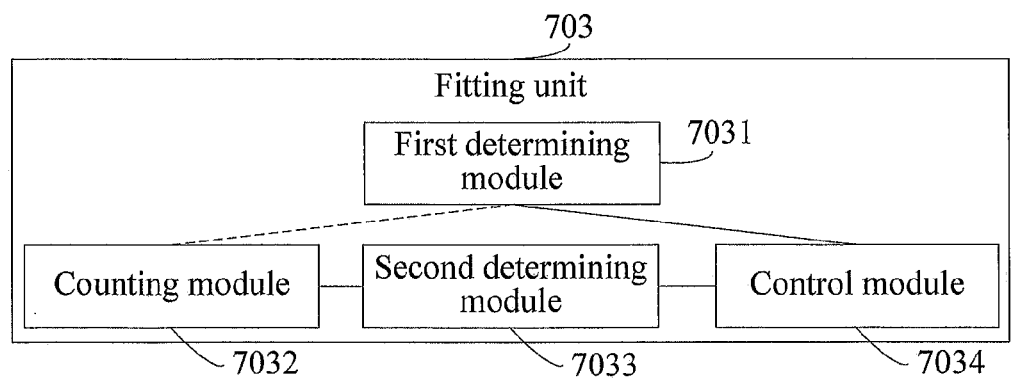
FIG. 9 is a schematic diagram of a fitting unit in an interference suppression apparatus according to an embodiment of the present invention.

Further, as shown in FIG. 9, the fitting unit 703 includes a first determining module 7031, a counting module 7032, a second determining module 7033, and a control module 7034.

The first determining module 7031 is configured to determine whether the system clock is the same as the optimal clock.

The counting module 7032 is configured to: when the system clock is different from the optimal clock, perform periodic cumulative counting on a clock edge quantity of the optimal clock to obtain a current count value, where a count period of the counting module is a clock edge quantity of the optimal clock included in a period T.

The second determining module 7033 is configured to: determine a relationship between the current count value and a preconfigured valid clock edge quantity, where the preconfigured valid clock edge quantity is a clock edge quantity of the system clock included in the period T.

The control module 7034 is configured to: if the current count value is greater than the preconfigured valid clock edge quantity, gate a current clock edge of the optimal clock.

The control module 7034 is further configured to: if the current count value is less than or equal to the preconfigured valid clock edge quantity, output a current clock edge of the optimal clock.

The control module 7034 is further configured to: when the system clock is the same as the optimal clock, output a current clock edge of the optimal clock.

It should be noted that the first determining module 7031 may be connected to the counting module 7032, and may also be not connected to the counting module 7032, which is not specifically limited in the embodiment of the present invention, and only a dotted line is used to indicate a connection relationship between the first determining module 7031 and the counting module 7032.

Further, that the first determining module 7031 determines whether the system clock is the same as the optimal clock specifically includes:

determining, according to a preconfigured gating enable parameter, whether the system clock is the same as the optimal clock.

Figure 10:
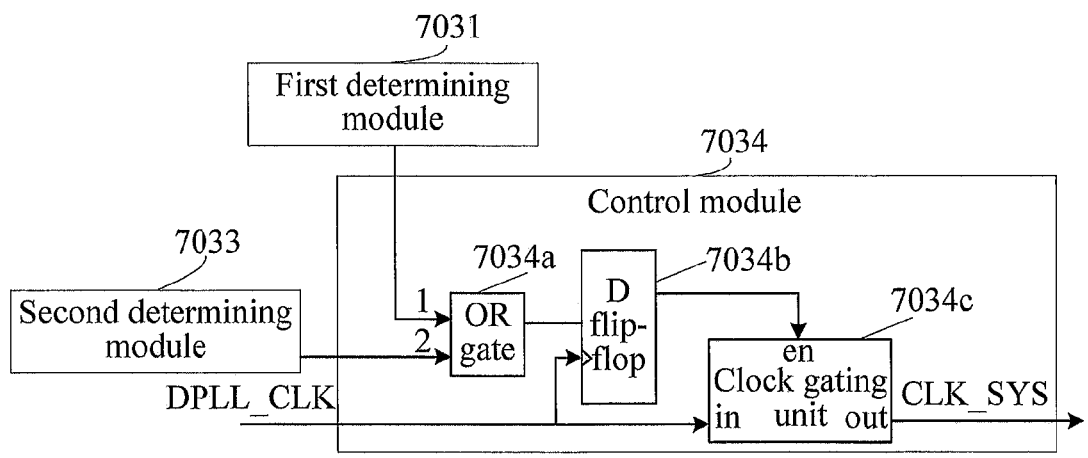
FIG. 10 is a schematic diagram of a control module in a fitting unit in an interference suppression apparatus according to an embodiment of the present invention.

Further, as shown in FIG. 10, the control module 7034 includes: an OR gate 7034a, a D flip-flop 7034b, and a clock gating unit 7034c.

The first determining module 7031 is gating disabled, a first input end of the OR gate 7034a is connected to a gating disabled end of the first determining module 7031, a second input end of the OR gate 7034a is connected to an output end of the second determining module 7033, an output end of the OR gate 7034a is connected to an input end of the D flip-flop 7034b, a clock input end of the D flip-flop 7034b inputs the optimal clock, and an output end of the D flip-flop 7034b is connected to an enable end of the clock gating unit 7034c.

That the control module 7034 is configured to: if the current count value is greater than the preconfigured valid clock edge quantity, gate a current clock edge of the optimal clock specifically includes that:

when the system clock is different from the optimal clock, the gating enable parameter is enable 1, and the gating disabled end of the first determining module 7031 is 0; if the current count value is greater than the preconfigured valid clock edge quantity, the output end of the second determining module 7033 is 0, and in this case, the output end of the OR gate 7034a outputs 0; when the optimal clock input by the clock input end of the D flip-flop 7034b increases from a low level to a high level, the output end of the D flip-flop 7034b outputs 0, and in this case, the enable end of the clock gating unit 7034c is connected to 0, and the clock gating unit 7034c stops outputting the current clock edge of the optimal clock.

That the control module 7034 is further configured to: if the current count value is less than or equal to the preconfigured valid clock edge quantity, output a current clock edge of the optimal clock specifically includes that:

when the system clock is different from the optimal clock, the gating enable parameter is enable 1, and the gating disabled end of the first determining module 7031 is 0; if the current count value is less than or equal to the preconfigured valid clock edge quantity, the output end of the second determining module 7033 is 1, and in this case, the output end of the OR gate 7034a outputs 1; when the optimal clock input by the clock input end of the D flip-flop 7034b increases from a low level to a high level, the output end of the D flip-flop 7034b outputs 1, and in this case, the enable end of the clock gating unit 7034c is connected to 1, and the clock gating unit 7034c outputs the current clock edge of the optimal clock.

That the control module 7034 is further configured to: when the system clock is the same as the optimal clock, output a current clock edge of the optimal clock specifically includes that:

when the system clock is the same as the optimal clock, the gating enable parameter is disable 0, and the gating disabled end of the first determining module 7031 is 1; in this case, the output end of the OR gate 7034a outputs 1; when the optimal clock input by the clock input end of the D flip-flop 7034b increases from a low level to a high level, the output end of the D flip-flop 7034b outputs 1, and in this case, the enable end of the clock gating unit 7034c is connected to 1, and the clock gating unit 7034c outputs the current clock edge of the optimal clock.

Specifically, the interference suppression apparatus may specifically be an ROC chip, and may also be a PCB board having digital-analog interference, which is not specifically limited in the embodiment of the present invention. For a method for implementing interference suppression by using the interference suppression apparatus, reference may be made to the description of Embodiment 1 and Embodiment 2, and details are not repeatedly described in the embodiment of the present invention.

The embodiment of the present invention provides an interference suppression apparatus. The apparatus includes a receiving unit and a converting unit. The receiving unit is configured to receive a system clock, where a current frequency of the system clock is a first frequency; and the converting unit converts the system clock into an optimal clock of a current sensitive frequency band, where the optimal clock and high-order harmonics of the optimal clock do not fall within a receive band of the sensitive frequency band, where the optimal clock is selected, with reference to the sensitive frequency band, from the system clock and at least one planned clock which is determined according to the first frequency, a frequency of the at least one planned clock is a second frequency, a frequency increment of the second frequency relative to the first frequency is less than or equal to a preset threshold, and the converting unit is configured according to the first frequency and a clock frequency of the optimal clock.

Based on an interference suppression apparatus provided by the foregoing embodiment, by using a method of flexibly adjusting the clock frequency so that the optimal clock and the high-order harmonics of the optimal clock do not fall within the receive band of the sensitive frequency band, the apparatus can eliminate interference of a digital circuit with an analog circuit. In addition, the optimal clock in the solution does not need to be generated by using a multiphase clock, and is only related to the current sensitive frequency band. Therefore, the solution has a simple physical layout, is inheritable, and reduces a development workload.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An interference suppression method for use in a device having a receiver and a processor, the method comprising:
receiving, by the receiver, a system clock signal having a first frequency; and converting, by the processor, the system clock signal into an optimal clock signal of a current sensitive frequency band, wherein the optimal clock signal and high-order harmonics of the optimal clock signal do not fall within a receive band of the current sensitive frequency band, wherein the optimal clock signal is selected, with reference to the current sensitive frequency band, from the system clock signal and at least one planned clock signal which is determined according to the first frequency, a frequency of the at least one planned clock signal is a second frequency, and a frequency increment of the second frequency relative to the first frequency is less than or equal to a threshold.

2. The method according to claim 1, wherein selection of the optimal clock signal comprises:

determining the at least one planned clock signal according to the first frequency, wherein the frequency increment of the second frequency of the at least one planned clock signal relative to the first frequency is less than or equal to the threshold; and selecting the optimal clock signal from the system clock signal and the at least one planned clock signal with reference to the current sensitive frequency band and according to a first principle, wherein the first principle comprises:

selecting a clock signal of which no high-order harmonic falls within a transmit band and the receive band as a candidate clock signal, so that when the optimal clock signal is the candidate clock signal, the optimal clock signal and the high-order harmonics of the optimal clock signal do not fall within the receive band of the current sensitive frequency band, and the optimal clock signal and the high-order harmonics of the optimal clock signal do not fall within the transmit band of the current sensitive frequency band;

if only one candidate clock signal exists, using the candidate clock signal as the optimal clock signal;

if a plurality of candidate clock signals exist, selecting a clock signal with a lowest frequency from the plurality of candidate clock signals as the optimal clock signal; or when no candidate clock signal exists, selecting a clock signal capable of implementing interference suppression within the receive band of the current sensitive frequency band as the optimal clock signal, so that the optimal clock signal and the high-order harmonics of the optimal clock signal do not fall within the receive band of the current sensitive frequency band.

3. The method according to claim 1, wherein the second frequency is a clock frequency generated by dividing the first frequency by an integer.

4. The method according to claim 1, wherein after converting the system clock signal into an optimal clock signal of a current sensitive frequency band, the method further comprises:

fitting the optimal clock signal, so that a clock frequency after the fitting does not change relative to the first frequency.

5. The method according to claim 4, wherein fitting the optimal clock signal comprises:

determining whether the system clock signal is the same as the optimal clock signal;

when the system clock signal is different from the optimal clock signal, performing periodic cumulative counting on a clock edge quantity of the optimal clock signal to obtain a current count value, wherein a count period is a clock edge quantity of the optimal clock signal comprised in a period T;

determining a relationship between the current count value and a preconfigured valid clock edge quantity, wherein the preconfigured valid clock edge quantity is a clock edge quantity of the system clock signal comprised in the period T;

if the current count value is greater than the preconfigured valid clock edge quantity, gating a current clock edge of the optimal clock signal;

if the current count value is less than or equal to the preconfigured valid clock edge quantity, outputting a current clock edge of the optimal clock signal; or when the system clock signal is the same as the optimal clock signal, outputting a current clock edge of the optimal clock signal.

6. The method according to claim 5, wherein determining whether the system clock signal is the same as the optimal clock signal comprises:

determining, according to a preconfigured gating enable parameter, whether the system clock signal is the same as the optimal clock signal.

7. The method according to claim 1, wherein the device is a radio on chip (ROC) device.

8. The method according to claim 1, wherein the device is a printed circuit board (PCB).

9. An interference suppression apparatus comprising:

a receiver configured to receive a system clock signal having a first frequency; and a processor configured to convert the system clock signal into an optimal clock signal of a current sensitive frequency band, wherein the optimal clock signal and high-order harmonics of the optimal clock signal do not fall within a receive band of the current sensitive frequency band, wherein the optimal clock signal is selected, with reference to the current sensitive frequency band, from the system clock signal and at least one planned clock signal which is determined according to the first frequency, a frequency of the at least one planned clock signal is a second frequency, a frequency increment of the second frequency relative to the first frequency is less than or equal to a threshold, and the processor is configured according to the first frequency and a clock frequency of the optimal clock signal.

10. The apparatus according to claim 9, wherein selection of the optimal clock signal comprises:

determining the at least one planned clock signal according to the first frequency, wherein the frequency increment of the second frequency of the at least one planned clock signal relative to the first frequency is less than or equal to the threshold; and selecting the optimal clock signal from the system clock signal and the at least one planned clock signal with reference to the current sensitive frequency band and according to a first principle, wherein the first principle comprises:

selecting a clock signal of which no high-order harmonic falls within a transmit band and the receive band as a candidate clock signal, so that when the optimal clock signal is the candidate clock signal, the optimal clock signal and the high-order harmonics of the optimal clock signal do not fall within the receive band of the current sensitive frequency band, and the optimal clock signal and the high-order harmonics of the optimal clock signal do not fall within the transmit band of the current sensitive frequency band;

if only one candidate clock signal exists, using the candidate clock signal as the optimal clock signal;

if a plurality of candidate clock signals exist, selecting a clock signal with a lowest frequency from the plurality of candidate clock signals as the optimal clock signal; or when no candidate clock signal exists, selecting a clock signal capable of implementing interference suppression within the receive band of the current sensitive frequency band as the optimal clock signal, so that the optimal clock signal and the high-order harmonics of the optimal clock signal do not fall within the receive band of the current sensitive frequency band.

11. The apparatus according to claim 9, wherein the second frequency is a clock frequency generated by dividing the first frequency by an integer.

12. The apparatus according to claim 9, wherein the processor is further configured to:

after converting the system clock signal into the optimal clock signal of a current sensitive frequency band, fit the optimal clock signal, so that a clock frequency after the optimal clock signal is fit does not change relative to the first frequency.

13. The apparatus according to claim 12, wherein the processor is further configured to:

determine whether the system clock signal is the same as the optimal clock signal;

when the system clock signal is different from the optimal clock signal, perform periodic cumulative counting on a clock edge quantity of the optimal clock signal to obtain a current count value, wherein a count period of the counting module is a clock edge quantity of the optimal clock signal comprised in a period T;

determine a relationship between the current count value and a preconfigured valid clock edge quantity, wherein the preconfigured valid clock edge quantity is a clock edge quantity of the system clock signal comprised in the period T;

if the current count value is greater than the preconfigured valid clock edge quantity, gate a current clock edge of the optimal clock signal;

if the current count value is less than or equal to the preconfigured valid clock edge quantity, output a current clock edge of the optimal clock signal; or when the system clock signal is the same as the optimal clock signal, output a current clock edge of the optimal clock signal.

14. The apparatus according to claim 13, wherein the processor is further configured to:

determine, according to a preconfigured gating enable parameter, whether the system clock signal is the same as the optimal clock signal.

\* \* \* \* \*